Dec. 14, 1965  J. N. BEEBE  3,223,965
SHALLOW WATER DEPTH ALARM
Filed Jan. 23, 1963
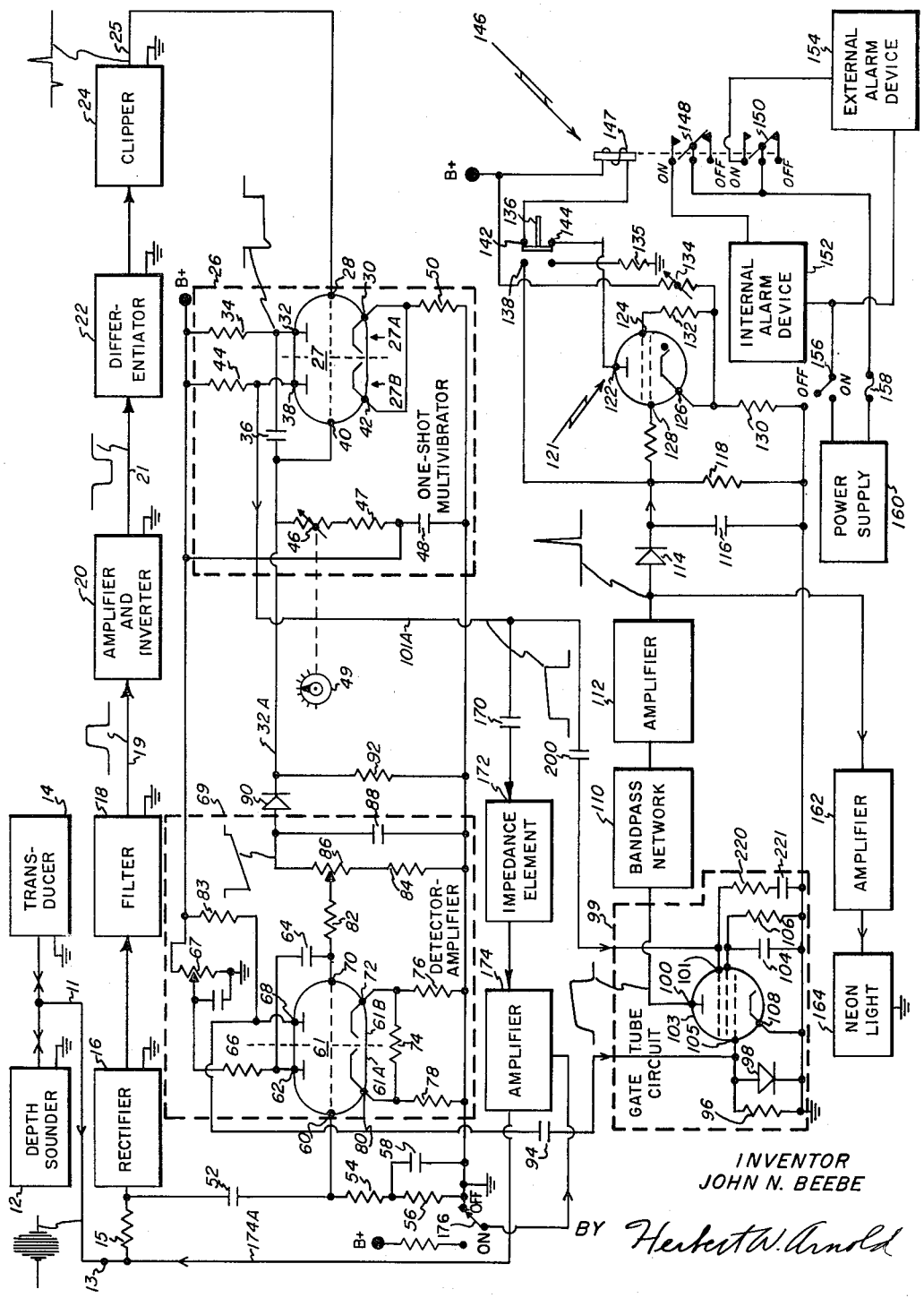
INVENTOR
JOHN N. BEEBE
BY *Herbert W. Arnold*
ATTORNEY

United States Patent Office 3,223,965
Patented Dec. 14, 1965

3,223,965
SHALLOW WATER DEPTH ALARM
John N. Beebe, San Mateo, Calif., assignor to Raytheon Company, Lexington, Mass., a corporation of Delaware
Filed Jan. 23, 1963, Ser. No. 253,444
3 Claims. (Cl. 340—3)

This invention relates to echo ranging apparatus and more particularly to apparatus for indicating predetermined depths in sonic echo depth sounders.

Sonic pulse echo depth sounders usually have indicators on which the ranges or depths of water may be continuously visually displayed. A common type of indicator is the recording indicator wherein a stylus is drawn across an electrically sensitized paper such that, if echo signals are applied to the stylus, they will produce a mark on the paper. Another type of indicator utilizes a neon lamp on a rotating arm with the echo signals applied to the light such that the range or depth is indicated by the rotational position at which the neon lamp lights. The aforesaid indicators require substantially continuous monitoring in order to avoid inadvertent navigation in depths of less than a safe distance.

This invention discloses a depth alarm device which may be used with the aforesaid depth sounders as well as others for indicating water depths of less than a predetermined value. In the apparatus of the invention, the transmitting pulse of a depth sounder triggers open a gate device which closes after a predetermined time interval, which may be preset, so that any echo pulse received after that predetermined time interval cannot pass and any echo pulse received during that time passes through the gate and triggers a discharge device such as a thyratron which operates a relay to turn on an alarm such as a light, bell or loud-speaker. For example, the predetermined value might be the minimum water depth in which a ship can navigate, and as the depth decreases below a preset value an alarm is sounded to alert the ship's navigator to this danger. With this arrangement continuous monitoring of the indicator on the depth sounder becomes unnecessary during navigation.

The invention further discloses a calibration circuit which provides an accurate indication on the depth sounder indicator of the depth to which the alarm device is set.

In addition, the invention discloses a device which indicates the presence of a substantial mass of objects, such as a school of fish, at a predetermined depth.

Other and further objects and advantages of this invention will be apparent as the description thereof progresses, reference being had to the accompanying drawing in which the single figure thereof is a combined schematic and block diagram of the depth alarm device of the present invention.

Referring specifically to the drawing, there is shown a depth sounder 12 such as that described in U.S. Patent No. 2,750,574 issued June 12, 1956 to Robert A. Fryklund which produces in a well known manner keyed electrical oscillations which are applied to a transducer 14. The transducer is a well known device which propagates pulses of compressional wave energy and translates reflected waves of this type into electrical oscillations or echo signals. The echo signals are coupled to the depth sounder and after detection and amplification therein are applied to an indicator which may be of the rotating light type as shown in the aforesaid U.S. Patent No. 2,750,574, or may be of the recording stylus type shown in U.S. Patent No. 2,759,168 issued August 14, 1956 to the same Robert A. Fryklund. In the aforesaid indicators, the range or depth is indicated by the rotational position at which the lamp lights or the stylus marks the paper.

In accordance with the present invention, portions of the transmitted signal from depth sounder 12 and the echo signal from transducer 14 are coupled to input terminal 13 of the depth alarm device. The transmitted signal is used to trigger a multivibrator which is adjusted to provide a gating waveform for a preset interval. This gating signal is fed to a gate. When the echo signal coincides with the preset interval an audible alarm is energized. In other words, when the time interval between transmission of a depth sounder signal and reception of an echo signal is less than a predetermined value, i.e., the length of the gate, the alarm is actuated, thus indicating, for example, the presence of a shallow reef. For example, and by way of a brief description, a transmitted pulse from the depth sounder 12 to the transducer 14 is detected, shaped, amplified and coupled to one-shot multivibrator 26. The multivibrator generates a positive gate which is coupled to gate tube circuit 99 causing the coincidence tube 103 to be operable for a period of time equal to the length of the gate. An echo pulse from the transducer 14 to the depth sounder 12 is sensed at detector-amplifier 69 which amplifies the echo signal and couples it to gate tube circuit 99. If the echo signal arrives during the period of the gate it is amplified in tube 103, filtered by network 110 and amplified again in amplifier 112. From amplifier 112 the pulse is coupled through an integrating network to thyratron tube 121 causing the thyratron tube to fire or ionize. When the thyratron fires it energizes relay 146 which closes the alarm circuits 152 and 154.

Considering now the circuit of the drawing in more detail, it can be seen that a signal emanating from depth sounder 12 is coupled by way of line 11 to input terminal 13 of the depth alarm apparatus. The transmitted signal as shown on line 11 may be, for example, a 25 kilocycle RF signal of relatively short pulse duration. This signal is attenuated by isolating resistor 15 and rectified by rectifier 16 which may comprise, for example, a simple unidirectional diode device. The radio frequency oscillation of the RF signal is then filtered out or suppressed by filter 18 which may comprise, for example, a simple RC network, leaving only the positive envelope as shown on line 19. This envelope is amplified and inverted by amplifier and inverter device 20 which may comprise a triode tube amplifier circuit. The output of amplifier 20 is shown on line 21. A differentiator 22, such as an RC network, differentiates the amplified and inverted envelope signal and produces two spaced spikes or sharp rising short duration pulses. The first, a negative spike, corresponds to the beginning of the transmitted 25 kc. signal from depth sounder 12, and the second, a positive spike, occurs at the end of the transmission. The negative spike is clipped by clipper 24 which may be a diode device, not shown. The resulting waveform as shown on line 25 consists mainly of a positive spike corresponding in time to the end of the transmitted 25 kc. signal. The depth alarm sensitivity and time delay circuits which are triggered or timed by this positive spike are thereby made independent of the width of the transmitted pulse. The positive spike is coupled to grid electrode 28 of tube 27 and triggers one-shot multivibrator circuit 26. In the quiescent period, prior to triggering, one-half (27B) of tube 27 conducts through cathode resistor 50, cathode 42, grid 40, plate 38 and plate resistor 44 to the B+ terminal, thereby permitting capacitor 36 to charge. When triggered, the other half (27A) conducts through cathode resistor 50, cathode 30, grid 28, plate 32 and plate resistor 34 to the B+ terminal, causing capacitor 36 to discharge. When capacitor 36 discharges it causes current to flow in variable resistors 46 and 47. The voltage developed by this current through resistors 46 and 47 cuts off the 27B half of tube 27, causing the plate voltage at plate 38 to rise. This rise in voltage is applied by way of lead 101A and coupling capacitor 200 to the suppressor grid 101 of tube 103 which is, for example, a 6AS6 sharp cut-off pentode. The voltage waveform is shown on line 101A and causes coincidence tube 103 to conduct when presented with an appropriate concurrent signal at its grid electrode 105. The length of time that the half 27B of tube 27 is cut off is determined by the setting of variable resistors 46 and 47. Accordingly, resistors 46 and 47 determine the length of time the gate tube circuit is open, i.e., tube 103 is operable so as to pass echo signals present at its grid 105. Dial 49 is mechanically coupled to variable resistor 46 so as to provide a visual indication of the setting of resistor 46. Said setting may be calibrated and indexed in feed or fathoms as required. Additionally, a test or calibration signal is provided in accordance with the invention for visual display on the depth sounder indicator of an accurate indication of the minimum depth at which the alarm is actuated. Circuitry for providing such test signal is described in detail subsequently.

Assuming that an echo signal is received at transducer 14 within the time interval established by the setting of resistor 46, then, in accordance with the invention, this echo signal will be passed through coincidence tube 103 so as to ultimately operate an alarm. Accordingly, echo signals from transducer 14 are coupled via line 11 to input terminal 13 and are attenuated by resistor 15. The echo signal is coupled by capacitor 52 to the grid electrode 60 of a high amplification factor twin triode tube designated generally by the reference numeral 61 which amplifies the signal to a suitable level. The gain of amplifier tube 61 is controlled in three ways. Resistor 67 provides an adjustment of plate voltage from power supply source B+ to plate electrode 62 of tube 61. This adjustment results in a constant gain setting. A fast time variable gain (TVG) network consisting of capacitor 58 and resistor 56 produces a relatively fast increase in gain with respect to time at tube 61A as capacitor 58 charges with rectified grid current. A slow TVG network, consisting of resistor 82 (coupled at one end to grid 70 of tube 61B, and at the other end to the wiper arm of potentiometer 86), resistor 84 (coupled between resistor 86 and ground), capacitor 88 (in shunt across resistors 86 and 84) and potentiometer 86 provides a relatively slow increase in gain versus time at tube 61B as capacitor 88 is charged by the gate pulse on line 32A from the plate circuit 32 of multivibrator tube 27 during the gate period. The effect of the slow and fast TVG networks combination is to automatically make the alarm device of the invention more sensitive in deeper water where it is expected that the echo strength will be weaker.

After being amplifier by both stages or halves (61A and 61B) of tube 61 the signal is coupled by capacitor 94 to the control grid 105 of tube 103. If the tube is gated open by the application of the aforesaid gating signal from tube 27 to electrode 101, the echo signal is amplified by tube 103 and appears at plate electrode 100 as shown.

The originally propagated frequency of 25 kc. is selected by the bandpass network 110 which is a tuned circuit resonant at the frequency of the depth sounder transmitter. The 25 kc. signal selected by network 110 is amplified in amplifier 112, rectified by diode 114 to derive the envelope of the echo pulse and coupled to an integrating network comprising capacitor 116 and resistor 118 in parallel.

The integrating network is utilized to ensure that only a continuous bottom return or succession of echo pulses will trigger the alarm. Thus, random signals, indicative of stray fish or floating seaweed rather than a shallow bottom, will not cause confusion as by false sounding of the alarm. For example, a pulse coming through diode 114 charges capacitor 116, which then discharges through bleeder resistor 118 to ground. If the echo rate or number of pulses received per unit time at capacitor 116 is such that capacitor 116 charges faster than resistor 118 can bleed or discharge it, the voltage across capacitor 116 will rise until it reaches a level sufficient to fire or ionize the gas in tube 121, which is, for example, a 2D21W thyratron. By adjusting the bias on the shield grid electrode 124 of tube 121 by means of variable resistor 134 the firing level may be controlled. When tube 121 fires or ionizes it conducts heavily thereby energizing relay 146 which is in the path of conduction from ground through cathode resistor 130 to plate electrode 122, push-button contacts 144 and 142 and relay winding 147 to the B+ power supply terminal. When relay 146 is energized relay arm 148 moves to the ON position providing a complete current path for current from power supply 160 through fuse 158 and relay arm 148 to internal alarm device 152 thereby activating said device when switch 156 is in the ON position.

In like manner, relay arm 150 activates external alarm device 154 when the arm is pulled to the ON position by the energization of relay coil 147. Internal and external alarm devices 152 and 154 may be, for example, buzzers, bells and the like. External alarm device 154 may be located at a distant spot on the ship removed from the location of the internal alarm device so as to alert personnel at that remote location.

It should be noted that the usefulness of the depth alarm of the invention is not limited to detection of land masses below the surface of the water. On the contrary, by selecting a depth setting which is above the known or anticipated water depth, the device may be utilized to detect the presence of a school of fish. In this connection it is noted that the integrating network of resistor 118 and capacitor 116 serves to prevent actuation of the alarm except when the echo return at said predetermined depth is substantial, thereby preventing erroneous indications which might be produced by a few isolated fish or the like.

Provision is made for resetting the system after it has been fired by depressing the reset push-button 136. This temporarily opens the relay coil circuit and discharges capacitor 116 through resistor 135, shutting off tube 121.

The depth alarm device of the invention provides in addition to the aforementioned sensitivity and integrating features a test circuit which provides an indication on the depth sounder indicator of the depth to which the alarm is actually set with reference to the depth sounder thereby checking the calibration of dial 49. The depth alarm times the sounding pulse from the transmission wave tail to the echo wave front. Since the echo wave front is a reflection of the transmitted wave front, there is a time constant built into the depth alarm equal to the width of the transmitted pulse. The alarm is calibrated, at the time of installation, for the width of pulses normally used.

The test circuit is made operative by switching switch 176 to the ON position, thereby providing a path for B+ voltage to amplifier 174. Amplifier 174 is coupled through tuned circuit 172 and coupling capacitor 170 to the plate of tube 27B. The voltage at plate 38 of tube 27B is a square wave as shown on line 101a which starts coincident with the lagging edge of the transmitted pulse and terminates at a time corresponding to the predetermined minimum allowable round trip distance travelled by the transmitted pulse. The length of the square wave is established as aforesaid by the setting of variable resistor 46 coupled to dial 49 and calibration resistor 47. The square wave voltage at plate electrode 38 is differentiated by capacitor 170 to form a first sharp pulse or spike when the gate or square wave starts and a second spike when it closes. The spikes are coupled to tuned circuit 172 which, for example, is an LC resonant circuit which rings or produces an oscillating voltage in response to said spikes at a predetermined frequency such as 25 kc. It should be noted that the spikes alone could be applied directly to the depth sounder to produce an indication thereon and that therefore the tuned circuit is not essential to the operation of the device. The ringing or spiked signal is coupled to amplifier 174 which is operative when test switch 176 is in the ON position. Accordingly, amplifier 174 amplifies the ringing signal which is then coupled by way of lead 174A to input terminal 13 and thence to depth sounder 12 by way of lead 11. A portion of the ringing signal is also coupled to detector-amplifier circuit 69 by way of capacitor 52 where it appears as an echo signal at the alarm set depth and is passed through the circuit to actuate the alarm. At the same time, the ringing signal has been coupled, as aforesaid, to the indicator on depth sounder 12 where, if the depth alarm is properly calibrated, it registers as a depth echo at the depth setting indicated by dial 49. In this manner the alarm depth setting of resistor 46 may be checked against the particular depth sounder being used. If the depth reading on the depth sounder indicator differs from the index reading of dial 49 calibration resistor 47 is adjusted so as to bring the two readings into agreement. In this manner the highly accurate indication on the depth sounder can be used to verify the setting of the depth alarm dial 49. In addition, any 25 kc. signal, test or echo passing through tube 103 is ultimately coupled to amplifier 162 which amplifies it and applies it to neon indicator light 164. Therefore, neon light 164 may be used as a fine indicator when adjusting or calibrating the system without using the thyratron and alarm. The neon lamp may be used as a trouble shooting indicator to aid in isolating circuit malfunctions.

It should be noted in considering the aforesaid explanation of the depth alarm device that both the transmitted pulse and the echo pulse derived therefrom are coupled by way of input terminal 13 to rectifier 16 as well as to detector-amplifier 69. However, by virtue of the timing and biasing apparatus of the invention, it is only necessary to consider the effect of the transmitted pulse on the circuit following rectifier 16 because the echo pulse is not of sufficient strength to trigger the one-shot multivibrator 26. Conversely, the transmitted pulse, although of sufficient signal strength to trigger the multivibrator, cannot pass through gate tube circuit 99 since the gate is opened starting at the lagging edge of the transmitted pulse. Hence, the transmitted pulse has no significant effect on the echo circuitry and the echo pulse does not effect the transmitted pulse circuit. In this manner, provision is made for coupling the depth alarm device to existing depth sounder and transducer combinations.

This completes the description of the preferred embodiment of the invention. However, many modifications of the invention will be apparent to persons skilled in the art. For example, the pentode tubes could be used instead of the triodes shown in the drawing. Furthermore, semiconductor devices such as transistors could be substituted for the tube elements shown in the drawing.

Accordingly, it is desired that this invention not be limited except as defined by the appended claims.

What is claimed is:

1. In a depth alarm device having transducer means for generating an echo ranging pulse signal, the combination comprising
   (a) a first means for deriving a variable width gating signal in response to the lagging edge of said echo ranging pulse signal including differentiator means for differentiating said echo ranging pulse signal and producing first and second spaced apart signal spikes and a multivibrator connected to said differentiator means for producing said variable width gating signal in response to said second signal spike,
   (b) alarm means,
   (c) coincidence means coupled to said first means for coupling an echo signal derived from said pulse signal, upon time coincidence between said gating signal and said echo signal, to said alarm means to activate said alarm means when the time lag between said pulse signal and said echo signal is less than a pre-set value,
   (d) means connected between said alarm and coincidence means for integrating successive signals and preventing activation of said alarm means until the rate of reception of said echo signals exceeds a predetermined value, and
   (e) calibration circuit means connected to said multivibrator for testing the response of said depth alarm device including differentiator means responsive to said gating signal for producing third and fourth signal spikes spaced apart by an amount indicative of the maximum depth at which said alarm is actuated.

2. In a depth alarm device in association with a depth sounder device having a depth indicator for indicating depth in response to echoes, the combination comprising
   (a) a multivibrator circuit including a variable resistor and being responsive to the lagging edge of the transmitted pulse from the depth sounder device for producing a gating signal starting coincident with the lagging edge of said transmitted pulse and ending at a pre-set interval determined by the impedance setting of said variable resistor in said multivibrator circuit,
   (b) an alarm means,
   (c) amplifier means for automatically rendering said alarm means more sensitive in deeper water, said last means including a slow and a fast time variable gain network,
   (d) coincidence means coupled to said multivibrator circuit for coupling an echo signal derived from said pulse signal, upon time coincidence between said gating signal and said echo signal, to said alarm means to activate said alarm means when the time lag between said pulse signal and said echo signal is less than a pre-set value,
   (e) means connected between said alarm and coincidence means for integrating successive echo signals and preventing activation of said alarm means until the rate of reception of said echo signals exceeds a predetermined value,
   (f) trouble shooting indicator means electrically connected with said alarm means for locating circuit malfunctions,
   (g) visual display means connected to said variable resistor and being responsive to the impedance setting of said variable resistor for displaying the maximum depth at which said alarm means is actuated, and
   (h) calibration circuit means connected between said multivibrator and the depth indicator of said depth sounder for testing the response of said depth alarm device and being responsive to said gating signal for producing signals which cause the depth indicator of said depth sounder to accurately indicate the maximum depth at which said alarm is actuated.

3. In a depth alarm device in association with a depth sounder device having a depth indicator for indicating depth in response to echoes, the combination comprising
   (a) a multivibrator circuit including a variable resistor and being responsive to the lagging edge of the transmitted pulse from said depth sounder device for producing a gating signal starting coincident with the lagging edge of said transmitted pulse and ending at a pre-set interval determined by the impedance setting of said variable resistor in said multivibrator circuit,
   (b) an alarm means,
   (c) amplifier means for automatically rendering said alarm means more sensitive in deeper water, said last means including a slow and a fast time variable gain network, (d) coincidence means coupled to said multivibrator circuit for coupling an echo signal derived from said pulse signal, upon time coincidence between said gating signal and said echo signal, to said alarm means to activate said alarm means when the time lag between said pulse signal and said echo signal is less than a pre-set value, (e) means connected between said alarm and coincidence means for integrating successive echo signals and preventing activation of said alarm until the rate of reception of said echo signals exceeds a predetermined value, (f) trouble shooting indicator means electrically connected with said alarm means for locating circuit malfunctions, (g) visual display means connected to said variable resistor and being responsive to the impedance setting of said variable resistor for displaying the maximum depth at which said alarm means is actuated, and (h) calibration circuit means including differentiator means connected between said multivibrator and the depth indicator of said depth sounder for testing the response of said depth alarm device and being responsive to said gating signal for producing two signal spikes spaced apart by an amount proportional to the length of said gating signal which cause the depth indicator of said depth sounder to accurately indicate the maximum depth at which said alarm is actuated.

References Cited by the Examiner
UNITED STATES PATENTS

| | | | |
|---|---|---|---|
| 2,560,587 | 7/1951 | Miller | 340—3 X |
| 2,580,560 | 1/1952 | Larsen | 343—13 |
| 2,706,285 | 4/1955 | Scott | 340—3 |
| 2,759,783 | 8/1956 | Ross | 340—3 X |
| 2,998,591 | 8/1961 | Lovett | 340—1 |
| 3,036,289 | 5/1962 | Beebe et al. | 340—3 |
| 3,042,899 | 7/1962 | Kendall et al. | 340—3 |
| 3,153,770 | 10/1964 | Feistman et al. | 340—3 |

CHESTER L. JUSTUS, *Primary Examiner.*